US012384376B2

(12) United States Patent
Kato

(10) Patent No.: US 12,384,376 B2
(45) Date of Patent: Aug. 12, 2025

(54) VEHICLE SYSTEM, CONTROL METHOD, AND STORAGE MEDIUM

(71) Applicant: HONDA MOTOR CO., LTD., Tokyo (JP)

(72) Inventor: Daichi Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 247 days.

(21) Appl. No.: 18/121,612

(22) Filed: Mar. 15, 2023

(65) Prior Publication Data

US 2023/0311888 A1    Oct. 5, 2023

(30) Foreign Application Priority Data

Mar. 31, 2022   (JP) ................................ 2022-059784

(51) Int. Cl.
*B60W 30/18* (2012.01)
*B60W 40/08* (2012.01)
*B60W 50/08* (2020.01)
*B60W 60/00* (2020.01)
*G06V 20/56* (2022.01)

(52) U.S. Cl.
CPC ...... *B60W 30/18163* (2013.01); *B60W 40/08* (2013.01); *B60W 50/08* (2013.01); *B60W 60/001* (2020.02); *G06V 20/588* (2022.01); *B60W 2552/53* (2020.02)

(58) Field of Classification Search
CPC .......... B60W 30/18163; B60W 40/08; B60W 50/08; B60W 60/001; B60W 2552/53; G06V 20/588; G06V 20/58; G06V 20/597
See application file for complete search history.

(56) References Cited

U.S. PATENT DOCUMENTS

| 8,825,265 B1 * | 9/2014 | Ferguson | B60W 40/072 701/26 |
| 9,459,625 B1 * | 10/2016 | Ferguson | G08G 1/096725 |
| 10,293,819 B1 * | 5/2019 | El-Khatib | B60W 60/00274 |

(Continued)

FOREIGN PATENT DOCUMENTS

| JP | 2004-171391 | 6/2004 |
| JP | 2016-216022 | 12/2016 |

(Continued)

OTHER PUBLICATIONS

Japanese Office Action for Japanese Patent Application No. 2022-059784 mailed Sep. 5, 2023.

*Primary Examiner* — Phutthiwat Wongwian
*Assistant Examiner* — Brian R Kirby
(74) *Attorney, Agent, or Firm* — Amin, Turocy & Watson, LLP

(57) ABSTRACT

A vehicle system restricts causing a host vehicle to perform lane change to a third lane adjacent to a second lane and a first lane and opposite to the second lane without depending on an operation of a driver, when determining that the host vehicle travels in the first lane and the second lane adjacent to the first disappears at a first distance ahead from a position of the host vehicle, and permits causing the host vehicle to perform the lane change to the third lane without depending on an operation of a driver, when the host vehicle reaches a second distance set between the first distance and a position at which the second lane disappears.

14 Claims, 10 Drawing Sheets

(56) References Cited

U.S. PATENT DOCUMENTS

| | | | |
|---|---|---|---|
| 10,632,997 B2 * | 4/2020 | Inou | B60W 60/0011 |
| 11,447,135 B2 * | 9/2022 | Takamatsu | G08G 1/167 |
| 11,835,956 B2 * | 12/2023 | Matsubara | B60W 30/18163 |
| 11,987,237 B2 * | 5/2024 | Abad | B60W 60/0053 |
| 2004/0107030 A1 | 6/2004 | Nishira et al. | |
| 2007/0142995 A1 * | 6/2007 | Wotlermann | B60K 31/0008 |
| | | | 701/96 |
| 2009/0060647 A1 * | 3/2009 | Denison | E01C 1/02 |
| | | | 404/1 |
| 2015/0100216 A1 * | 4/2015 | Rayes | G01S 13/867 |
| | | | 701/96 |
| 2016/0297447 A1 * | 10/2016 | Suzuki | B60W 30/16 |
| 2016/0339913 A1 * | 11/2016 | Yamashita | B60W 30/18163 |
| 2017/0018189 A1 * | 1/2017 | Ishikawa | G05D 1/0088 |
| 2017/0248959 A1 * | 8/2017 | Matsubara | B60W 30/18163 |
| 2018/0099676 A1 * | 4/2018 | Goto | B60W 30/10 |
| 2018/0346019 A1 * | 12/2018 | Fujii | B62D 6/001 |
| 2020/0049516 A1 * | 2/2020 | Morimoto | G05D 1/0278 |
| 2020/0180641 A1 * | 6/2020 | Hashimoto | B60W 30/18163 |
| 2020/0247412 A1 * | 8/2020 | Wang | G02B 27/01 |
| 2020/0369281 A1 | 11/2020 | Sato | |
| 2021/0088352 A1 * | 3/2021 | Nishida | G01C 21/3658 |

FOREIGN PATENT DOCUMENTS

| | | |
|---|---|---|
| JP | 2020-189543 | 11/2020 |
| JP | 2021-160541 | 10/2021 |

\* cited by examiner

VEHICLE SYSTEM, CONTROL METHOD, AND STORAGE MEDIUM

CROSS-REFERENCE TO RELATED APPLICATION

Priority is claimed on Japanese Patent Application No. 2022-059784, filed Mar. 31, 2022, the content of which is incorporated herein by reference.

BACKGROUND

Field of the Invention

The present invention relates to a vehicle system, a control method, and a storage medium.

Description of Related Art

In recent years, efforts to provide a sustainable transportation system that takes various situations into account have become active. In order to realize this, research and development is focused on further improving the safety or convenience of traffic through research and development regarding driving assistance technology. For example, a device that proposes lane change or executes the lane change has been disclosed (Japanese Unexamined Patent Application, First Publication Nos. 2021-160541 and 2016-216022).

SUMMARY

In a device of the related art, since the timing at which lane change is permitted has not been considered in detail, convenience for a user is not sufficiently high in some cases.

The present invention has been made in consideration of such circumstances, and one object thereof is to provide a vehicle system, a control method, and a storage medium capable of further improving convenience for a user. Further, the present invention contributes to the development of sustainable transportation systems.

A control device, a control method, and a storage medium according to the present invention adopt the following configurations.

(1): A vehicle system (for example, mounted on a mobile object) according to one aspect of the present invention includes a storage medium configured to store computer-readable instructions; and one or more processors connected to the storage medium, wherein the one or more processors execute the computer-readable instructions to: recognize a situation of surroundings of a host vehicle, automatically control at least steering of the host vehicle on the basis of the recognized situation of the surroundings, specify a position of the host vehicle in map information including information on lanes on the basis of the map information and a position of the host vehicle, restrict causing the host vehicle to perform lane change to a third lane adjacent to a second lane and a first lane and opposite to the second lane without depending on an operation of a driver when determining that the host vehicle travels in the first lane and the second lane adjacent to the first lane disappears at a first distance ahead from the position of the host vehicle on the basis of a result of the specifying, and permit causing the host vehicle to perform lane change to the third lane without depending on an operation of the driver when the host vehicle reaches a second distance set between the first distance and a position at which the second lane disappears.

(2): A vehicle system (for example, mounted on a mobile object) according to another aspect of the present invention includes a storage medium configured to store computer-readable instructions; and one or more processors connected to the storage medium, wherein the one or more processors execute the computer-readable instructions to: recognize a situation of surroundings of a host vehicle, automatically control at least steering of the host vehicle on the basis of the recognized situation of the surroundings, specify a position of the host vehicle in map information including information on lanes on the basis of the map information and a position of the host vehicle, restrict causing the host vehicle to perform lane change executed according to proposal of the vehicle system, the lane change being lane change to a third lane adjacent to a second lane and a first lane and opposite to the second lane, when determining that the host vehicle travels in the first lane and the second lane adjacent to the first lane disappears at a first distance ahead from the position of the host vehicle on the basis of a result of the specifying, and permit causing the host vehicle to perform the lane change to the third lane according to the proposal of the vehicle system when determining that the second lane disappears at a second distance shorter than the first distance ahead from the position of the host vehicle.

(3): In the aspect (2), the one or more processors execute the computer-readable instructions to: be able to execute first control for causing the host vehicle to perform lane change to an adjacent lane without depending on an operation of a driver of the host vehicle when the proposal of the vehicle system is approved, and second control for causing the host vehicle to perform the lane change to the adjacent lane without depending on the operation of the driver when the driver performs a predetermined operation for causing the lane change to be executed, and restrict the first control and permit the second control when determining that the host vehicle travels in the first lane and the second lane adjacent to the first lane disappears at a first distance ahead from the position of the host vehicle on the basis of a result of the specifying.

(4): In the aspect (3), the predetermined operation is that the driver operates a lever for operating a direction indicator in a direction in which the host vehicle is desired to perform lane change.

(5): In any one of the aspects (2) to (4), the one or more processors execute the computer-readable instructions: not to recommend causing the driver to perform lane change of the host vehicle to the second lane and the third lane when the host vehicle is located between the first distance and the second distance, and to recommend causing the driver to perform lane change of the host vehicle to the third lane when the host vehicle passes through a position at the second distance.

(6): In the aspect (1), the one or more processors execute the computer-readable instructions to: cause the host vehicle to perform the lane change to the third lane without depending on an operation of the driver when the recommendation is approved by the driver.

(7): In any one of the aspects (2) to (6), the one or more processors execute the computer-readable instructions to: recommend causing the driver to perform lane change of the host vehicle to the second lane when the host vehicle does not reach the first distance and travels in the first lane, recommend causing the driver to perform lane change of the host vehicle to the first lane when the host vehicle does not reach the first distance and travels in the second lane, and recommend causing the driver to perform lane change of the host vehicle to the first lane when the host vehicle does not reach the first distance and travels in the third lane, and the one or more processors execute the computer-readable instructions to perform the lane change of the host vehicle to an adjacent lane according to the recommendation without depending on the operation of the driver when the driver approves the recommendation.

(8): In any one of the aspects (1) to (7), a position corresponding to the second distance at which the lane change of the host vehicle to the third lane is permitted after the lane change is restricted is set on the basis of a position at which the host vehicle stops control for performing lane change by controlling the steering due to continuation of a state in which the host vehicle is unable to be caused to perform lane change, when it is assumed that the host vehicle travels in the second lane and the host vehicle automatically controls the steering without depending on an operation of the driver to perform lane change to the first lane.

(9): In any one of the aspects (1) to (7), a position corresponding to the second distance at which the lane change of the host vehicle to the third lane is permitted after the lane change is restricted is a position at which the host vehicle determines that the host vehicle has reached a position at which the driver of the host vehicle is able to recognize a marking or a road structure indicating that the second lane decreases in size.

(10): In the aspect (9), the one or more processors execute the computer-readable instructions to:
  determine whether the host vehicle has reached a position at which it is estimated that the driver is able to recognize the marking or the road structure on the basis of a result of the recognition.

(11): In the aspect (9) or (10), the one or more processors execute the computer-readable instructions to: determine whether the host vehicle has reached a position at which it is estimated that the driver is able to recognize the marking or the road structure on the basis of map information including information on the marking or the road structure and the position of the host vehicle.

(12): A control device according to another aspect of the present invention includes a storage medium configured to store computer-readable instructions; and one or more processors connected to the storage medium, wherein the one or more processors execute the computer-readable instructions: to recognize a situation of surroundings of a host vehicle, to automatically control at least steering of the host vehicle on the basis of the recognized situation of the surroundings, to specify a position of the host vehicle in map information including information on lanes on the basis of the map information and a position of the host vehicle, not to propose causing the host vehicle to perform lane change to a third lane adjacent to a second lane and a first lane and opposite to the second lane when determining that the host vehicle travels in the first lane and the second lane adjacent to the first lane disappears at a first distance ahead from the position of the host vehicle on the basis of a result of the specifying, and to propose causing the host vehicle to perform the lane change to the third lane according to the proposal of the vehicle system when determining that the second lane disappears at a second distance shorter than the first distance ahead from the position of the host vehicle.

(13): A control method according to another aspect of the present invention, wherein a control device executes: processing for recognizing a situation of surroundings of a host vehicle, processing for automatically controlling at least steering of the host vehicle on the basis of the recognized situation of the surroundings, processing for specifying a position of the host vehicle in map information including information on lanes on the basis of the map information and a position of the host vehicle, processing for restricting causing the host vehicle to perform lane change to a third lane adjacent to a second lane and a first lane and opposite to the second lane without depending on an operation of a driver when determining that the host vehicle travels in the first lane and the second lane adjacent to the first lane disappears at a first distance ahead from the position of the host vehicle on the basis of a result of the specifying, and processing for permitting causing the host vehicle to perform lane change to the third lane without depending on an operation of the driver when the host vehicle reaches a second distance set between the first distance and a position at which the second lane disappears.

(14): A storage medium having a program stored therein according to another aspect of the present invention causes a control device to execute: processing for recognizing a situation of surroundings of a host vehicle, processing for automatically controlling at least steering of the host vehicle on the basis of the recognized situation of the surroundings, processing for specifying a position of the host vehicle in map information including information on lanes on the basis of the map information and a position of the host vehicle, processing for restricting causing the host vehicle to perform lane change to a third lane adjacent to a second lane and a first lane and opposite to the second lane without depending on an operation of a driver when determining that the host vehicle travels in the first lane and the second lane adjacent to the first lane disappears at a first distance ahead from the position of the host vehicle on the basis of a result of the specifying, and processing for permitting causing the host vehicle to perform lane change to the third lane without depending on an operation of the driver when the host vehicle reaches a second distance set between the first distance and a position at which the second lane disappears.

According to the aspects (1) to (14), it is possible to improve convenience for a user.

According to the aspect (5), since recommendation suitable for the user is made, it is possible to further improve the convenience for the user.

According to the aspect (6) or (7), since the host vehicle performs the lane change without depending on an operation of a driver, it is possible to reduce a load on the driver.

According to the aspects (9) to (11), since lane change to a lane different from a decreasing lane is recommended when the driver recognizes a decrease in the number of lanes, it is possible to make suitable recommendation without giving discomfort to the driver.

DESCRIPTION OF EMBODIMENTS

[Overall Configuration]

Figure 1:
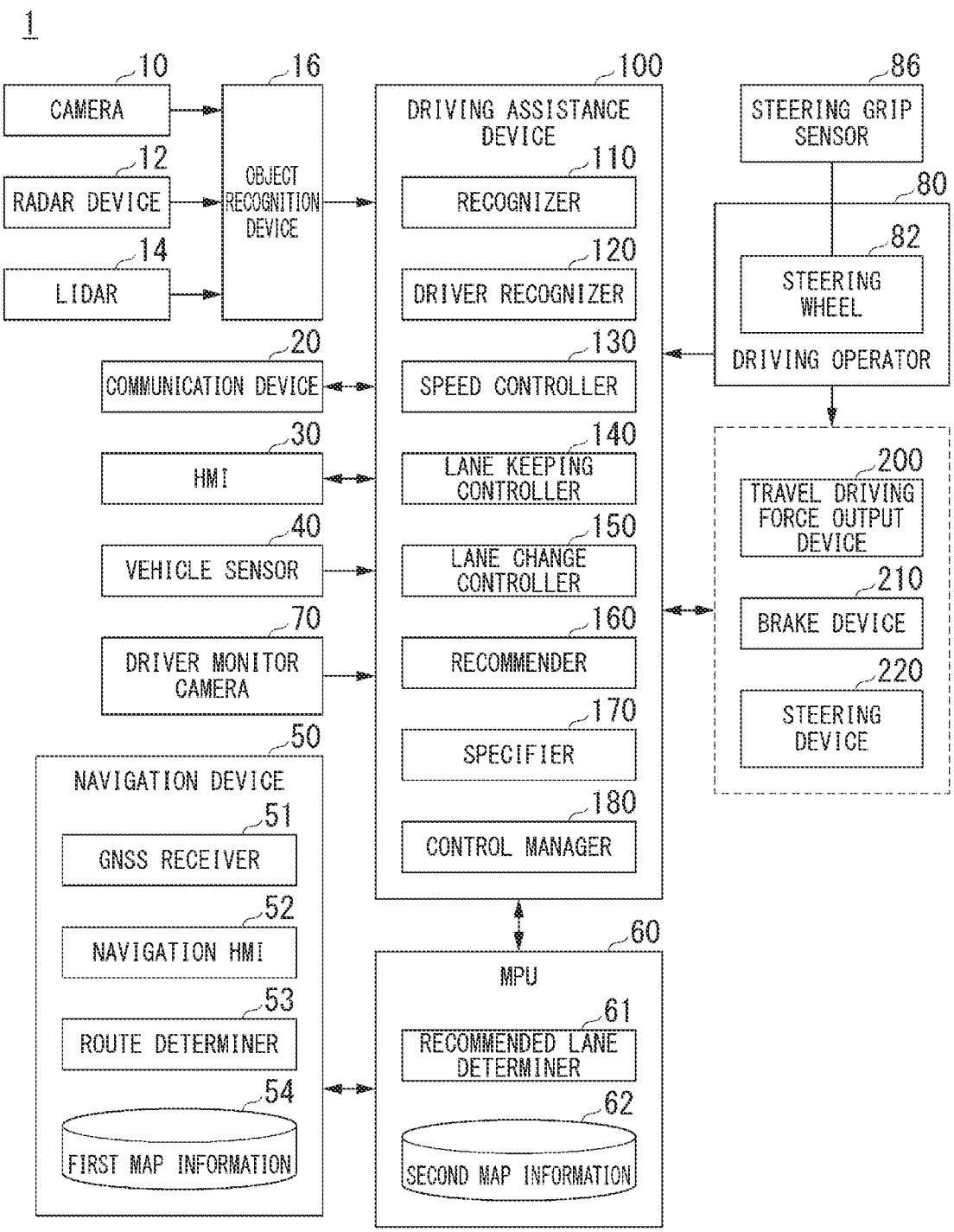
FIG. 1 is a configuration diagram of a vehicle system using a vehicle control system according to an embodiment.

FIG. 1 is a configuration diagram of a vehicle system 1 using a vehicle control system according to an embodiment. A vehicle on which the vehicle system 1 is mounted is, for example, a vehicle such as a two-wheeled vehicle, a three-wheeled vehicle, or a four-wheeled vehicle, and a driving source thereof includes an internal combustion engine such as a diesel engine or a gasoline engine, an electric motor, or a combination thereof. The electric motor operates using power generated by a power generator connected to the internal combustion engine or discharge power of a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, an MPU 60, a driver monitor camera 70, a driving operator 80, a driving assistance device 100, a travel driving force output device 200, a brake device 210, and a steering device 220. These devices or equipment are connected to each other by a multiplex communication line such as a controller area network (CAN) communication line, a serial communication line, a wireless communication network, or the like. The configuration shown in FIG. 1 is merely an example, and part of the configuration may be omitted or other configurations may be added thereto. The driving assistance device 100 is an example of a "control device".

The camera 10 is, for example, a digital camera using a solid-state imaging device such as a charge coupled device (CCD) or a complementary metal oxide semiconductor (CMOS). The camera 10 is attached to any location on a vehicle on which the vehicle system 1 is mounted (hereinafter referred to as a host vehicle M). When a forward side is imaged, the camera 10 is attached to, for example, an upper portion of a front windshield, a rear surface of a rearview mirror, or the like. The camera 10, for example, periodically and repeatedly images surroundings of the host vehicle M. The camera 10 may be a stereo camera.

The radar device 12 radiates radio waves such as millimeter waves to the surroundings of the host vehicle M and detects radio waves (reflected waves) reflected by an object to detect at least a position (a distance and orientation) of the object. The radar device 12 is attached to any location on the host vehicle M. The radar device 12 may detect a position and a speed of the object using a frequency modulated continuous wave (FM-CW) scheme.

The LIDAR 14 irradiates the surroundings of the host vehicle M with light (or an electromagnetic wave having a wavelength close to that of light) and measures scattered light. The LIDAR 14 detects a distance to a target on the basis of a time from light emission to light reception. The light to be radiated is, for example, pulsed laser light. The LIDAR 14 is attached to any location on the host vehicle M.

The object recognition device 16 performs sensor fusion processing on detection results of some or all of the camera 10, the radar device 12, and the LIDAR 14 to recognize a position, type, speed, and the like of the object. The object recognition device 16 outputs recognition results to the driving assistance device 100. The object recognition device 16 may output detection results of the camera 10, the radar device 12, and the LIDAR 14 as they are to the driving assistance device 100. The object recognition device 16 may be omitted from the vehicle system 1.

The communication device 20, for example, communicates with another vehicle present around the host vehicle M using a cellular network, a Wi-Fi network, Bluetooth (registered trademark), dedicated short range communication (DSRC), or the like or communicates with various server devices via a wireless base station.

The HMI 30 presents various types of information to an occupant of the host vehicle M and receives an input operation from the occupant. The HMI 30 includes various display devices, speakers, buzzers, touch panels, switches, keys, and the like. The HMI 30 has a display device. The display device (a display) is a so-called multi-information display, which is a display device that is provided, for example, in a central part of an instrument panel of the host vehicle M and displays various types of information in the host vehicle M, of a speedometer that indicates a traveling speed of the host vehicle M or a tachometer that indicates the number of rotations (a rotational speed) of an internal combustion engine included in the host vehicle M.

The vehicle sensor 40 includes, for example, a vehicle speed sensor that detects a speed of the host vehicle M, an acceleration sensor that detects an acceleration, a yaw rate sensor that detects an angular speed around a vertical axis, and an orientation sensor that detects a direction of the host vehicle M.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 specifies a position of the host vehicle M on the basis of a signal received from a GNSS satellite. The position of the host vehicle M may be specified or complemented by an inertial navigation system (INS) using an output of the vehicle sensor 40. The navigation HMI 52 includes a display device, a speaker, a touch panel, keys, and the like. The navigation HMI 52 may be partly or wholly shared with the HMI 30 described above. The route determiner 53, for example, determines a route (hereinafter, an on-map route) from the position of the host vehicle M specified by the GNSS receiver 51 (or any input position) to a destination input by the occupant using the navigation HMI 52 by referring to the first map information 54. The first map information 54 is, for example, information in which a road shape is represented by links indicating roads and nodes connected by the links. The first map information 54 may include a curvature of the road, point of interest (POI) information, and the like. The on-map route is output to the MPU 60. The navigation device 50 may perform route guidance using the navigation HMI 52 on the basis of the on-map route. The navigation device 50 may be realized, for example, by a function of a terminal device such as a smartphone or a tablet terminal possessed by the occupant. The navigation device 50 may transmit a current position and a destination to a navigation server via the communication device 20 and acquire the same route as the on-map route from the navigation server.

The MPU 60 includes, for example, a recommended lane determiner 61, and holds second map information 62 in a storage device such as an HDD or a flash memory. The recommended lane determiner 61 divides the on-map route provided from the navigation device 50 into a plurality of blocks (for example, divides the route every 100 [m] in a traveling direction of the vehicle), and determines a recommended lane for each block by referring to the second map information 62. The recommended lane determiner 61 determines in which lane from the left the host vehicle M travels. The recommended lane determiner 61 determines the recommended lane so that the host vehicle M can travel on a reasonable route for travel to a branch destination when there is a branch location in the on-map route.

The second map information 62 is map information with higher accuracy than the first map information 54. The second map information 62 includes, for example, information on a center of the lane or information on a boundary of the lane. The second map information 62 may include road information, traffic regulation information, address information (an address and postal code), facility information, telephone number information, and the like. The second map information 62 may be updated at any time by the communication device 20 communicating with another device.

The driver monitor camera 70 is, for example, a digital camera using a solid-state imaging device such as a CCD or CMOS. The driver monitor camera 70 is attached to any location on the host vehicle M at a position and orientation at which a head of an occupant (hereinafter referred to as a driver) seated in a seat of the driver of the host vehicle M can be imaged from the front (in an orientation in which a face is imaged). For example, the driver monitor camera 70 is attached to an upper part of the display device provided in the central part of the instrument panel of the host vehicle M. The driver monitor camera 70 outputs to the driving assistance device 100 an image obtained by imaging the vehicle cabin including the driver of the host vehicle M from a position at which the driver monitor camera 70 is disposed.

The driving operator 80 includes, for example, an operation switch of a direction indicator, an accelerator pedal, a brake pedal, a shift lever, and other operators, in addition a steering wheel 82. A sensor that detects an amount of operation or the presence or absence of an operation is attached to the driving operator 80, and a detection result thereof is output to the driving assistance device 100, or some or all of the travel driving force output device 200, the brake device 210, and the steering device 220. The steering wheel 82 does not necessarily have to be annular but may be in the form of a modified steering wheel, joystick, buttons, or the like. A steering grip sensor 86 is attached to the steering wheel 82.

The steering grip sensor 86 is realized by, for example, a capacitance sensor or a piezoelectric element. The steering grip sensor 86 detects whether or not the driver is gripping the steering wheel 82. The gripping is a state in which the driver grips the steering wheel, a state in which a hand comes into contact with the steering wheel and a predetermined degree or more of force is applied to the steering wheel, or the like.

The steering grip sensor 86 may detect grip based on an image captured by a camera or detect the grip using an optical scheme such as a radar device (a scheme that does not require contact with a sensor).

The driving assistance device 100 includes, for example, a recognizer 110, a driver recognizer 120, a speed controller 130, a lane keeping controller 140, a lane change controller 150, a recommender 160, a specifier 170, a control manager 180. Some or all of these functional units are realized, for example, by a hardware processor such as a central processing unit (CPU) executing a program (software). Some or all of these components may be realized by hardware (circuit; including circuitry) such as a large scale integration (LSI), an application specific integrated circuit (ASIC), a field-programmable gate array (FPGA), or a graphics processing unit (GPU), or may be realized by software and hardware in cooperation. The program may be stored in a storage device (a storage device including a non-transitory storage medium) such as an HDD or a flash memory of the driving assistance device 100 in advance or may be stored in a detachable storage medium such as a DVD or a CD-ROM and installed in the HDD or flash memory of the driving assistance device 100 by the storage medium (a non-transitory storage medium) being mounted in a drive device. A functional configuration including the lane change controller 150, the recommender 160, and the control manager 180 is an example of a "controller".

The recognizer 110 recognizes a status such as a position, speed, and acceleration of an object present around the host vehicle M on the basis of information input from the camera 10, the radar device 12, and the LIDAR 14 via the object recognition device 16. The position of the object, for example, is recognized as a position at absolute coordinates with a representative point (a centroid, a drive shaft center, or the like) of the host vehicle M as an origin and is used for control. The position of the object may be represented by a representative point such as a centroid or a corner of the object or may be represented by an area. The "status" of the object may include an acceleration or jerk of the object, or an "action status" (for example, whether or not the object is changing lanes or is about to perform lane change).

The recognizer 110, for example, recognizes a lane (a traveling lane) in which the host vehicle M is traveling. For example, the recognizer 110 compares a pattern of road demarcation lines (for example, an arrangement of solid lines and broken lines) obtained from the second map information 62 with a pattern of road demarcation lines around the host vehicle M recognized from an image captured by the camera 10 to recognize the traveling lane. The recognizer 110 may recognize not only the road demarcation lines but also a traveling road boundary (a road boundary) including road demarcation lines, a road shoulder, a curb, a median strip, a guard rail, or the like to recognize the traveling lane. In this recognition, the position of the host vehicle M acquired from the navigation device 50 or a processing result of the INS may be additionally considered. The recognizer 110 recognizes a temporary stop line, an obstacle, a red signal, a toll gate, and other road events.

The recognizer 110 recognizes a position or posture of the host vehicle M with respect to the traveling lane when recognizing the traveling lane. The recognizer 110 may recognize, for example, a deviation of a reference point of the host vehicle M from a center of the lane and an angle formed between a traveling direction of the host vehicle M and a line connecting the center of the lane as a relative position and posture of the host vehicle M with respect to the traveling lane. Instead, the recognizer 110 may recognize, for example, a position of the reference point of the host vehicle M with respect to any one of side edge portions (the road demarcation line or the road boundary) of the traveling lane as the relative position of the host vehicle M with respect to the traveling lane.

The driver recognizer 120 detects whether the driver is in a predetermined state on the basis of the image captured by the driver monitor camera 70. The predetermined state is a state in which hands-off lane keeping control, which will be described later, is executable. Hands-off is a state in which the driver does not grip the steering wheel, and hands-on is a state in which the driver grips the steering wheel. The state in which the hands-off lane keeping control is executable is a state in which the driver monitors the forward side.

Monitoring the forward side means, for example, that the driver monitors the forward side so that the driver can rapidly perform takeover from control of the vehicle by the vehicle system 1 to an operation with respect to the vehicle by the driver. Monitoring the forward side means, for example, that a line of sight of the driver is directed to the forward side.

The speed controller 130 automatically controls the travel driving force output device 200 and the brake device 210 without depending on an operation of the driver to automatically control the speed of the host vehicle M. The speed controller 130 executes so-called adaptive cruise control (ACC).

For example, when another vehicle is not present in front of the host vehicle M and within a predetermined distance from the host vehicle M, the speed controller 130 automatically controls the travel driving force output device 200 and the brake device 210 without depending on an operation of the driver so that the host vehicle M moves at a speed set by the driver or a legal speed.

For example, when another vehicle is present in front of the host vehicle M and within the predetermined distance from the host vehicle M, the speed controller 130 automatically controls the travel driving force output device 200 and the brake device 210 without depending on an operation of the driver so that the host vehicle M follows the other vehicle. "Following" means that the host vehicle M travels while maintaining a position behind the other vehicle and at a predetermined distance from the other vehicle.

The lane keeping controller 140 controls the steering device 220 so that the host vehicle M does not deviate from the traveling lane. For example, the lane keeping controller 140 controls the steering device 220 so that the host vehicle M travels at a center or near the center of the traveling lane recognized by the recognizer 110. Hereinafter, this control may be referred to as "lane keeping control". The Lane keeping controller 140 performs hands-on lane keeping control and hands-off lane keeping control.

The hands-on lane keeping control is control that is executed in the state in which the driver is gripping the steering wheel (a state in which the steering grip sensor 86 is detecting gripping of the steering wheel). A condition under which the hands-on lane keeping control is executable are looser than the conditions under which the hands-off lane keeping control is executable. For example, the hands-on lane keeping control is executed on the condition that the speed of the host vehicle M is equal to or higher than a predetermined speed and the driver is monitoring the forward side.

The hands-off lane keeping control is control that is executed in a state in which the driver does not grip the steering wheel (a state in which the steering grip sensor 86 does not detect gripping of the steering wheel). The hands-off lane keeping control is executable, for example, when the following conditions are satisfied. The conditions are that the speed of the host vehicle M is equal to or higher than the predetermined speed, that the host vehicle M travels on a predetermined road (for example, a road or a type of road set in advance as the hands-off lane keeping control being executable), and that the driver monitors the forward side. The hands-off lane keeping control is executed when the driver monitors the forward side, and the hands-off lane keeping control is not executed or stopped when the driver does not monitor the forward side.

The conditions under which the hands-on lane-keeping control and the hands-off lane-keeping control described above are executable are examples, and other conditions (for example, the host vehicle M follows a preceding vehicle) may be included, or some of the conditions may be omitted. The conditions under which the hands-on lane keeping control is executable may be looser than the conditions under which the hands-off lane keeping control is executable (the conditions under which the hands-off lane keeping control is executable may be stricter than the conditions under which the hands-on lane keeping control is executable).

The lane change controller 150 causes the host vehicle M to automatically change lanes. The lane change controller 150 causes the host vehicle M to automatically change lanes (ALC: auto lane change) when a lane change instruction is issued by the driver in a state in which the hands-off lane keeping control is being executed. The lane change instruction is an operation with respect to a lever of the operation switch of the direction indicator. For example, when the driver operates the lever in a direction in which the host vehicle M desires to perform lane change, the host vehicle M performs lane change in a direction corresponding to the operation. The lane change instruction may be an operation different from the operation with respect to the lever of the operation switch of the direction indicator. For example, the lane change may be performed when a predetermined operation button is pressed. When the driver approves the recommendation of the recommender 160, which will be described later, the lane change controller 150 causes the host vehicle M to perform lane change on the basis of the approval.

The lane change controller 150, for example, may execute lane change on the condition that the driver is gripping the steering wheel (the steering grip sensor 86 detects gripping of the steering wheel). The lane change controller 150 executes the lane change when the driver grips the steering wheel and further when the following conditions are satisfied, for example.

The conditions are, for example, that there are no obstacles in a lane that is a lane change destination, that the host vehicle M does not interfere with other vehicles around the host vehicle M when the host vehicle M performs the lane change, that a section is not a section in which lane change is prohibited (there are no road markings or signs indicating prohibition of lane change), that the lane that is a lane change destination is recognized (actually present), that a yaw rate detected by the vehicle sensor 40 is smaller than a threshold, and that a radius of a curvature of a road on which the host vehicle M is traveling is equal to or larger than a predetermined value. The conditions for executing the lane change may include other conditions, or some of the conditions may be omitted.

The recommender 160 proposes the lane change of the host vehicle M to the driver. This processing will be described in detail later.

The specifier 170 specifies the position of the host vehicle M in map information (the first map information 54 or the second map information 62) including the information on lanes on the basis of the map information and the position of the host vehicle M. The map information includes the information on lanes. The information on the lanes is, for example, information such as a position at which the lane disappears or a position at which the lane decreases in size. The specifier 170 specifies position of the host vehicle in the map information on the basis of the map information and the position of the host vehicle M. The specifier 170 specifies, for example, a position at which the lane decreases in size with respect to the position of the host vehicle M. For example, the specifier 170 specifies that an overtaking lane will decrease 5 km ahead.

The control manager 180 causes the recommender 160 to recommend lane change on the basis of the position of the host vehicle M. The control manager 180 permits or restricts that the lane change controller 150 performs lane change on the basis of the position of the host vehicle M. For example, when the control manager 180 permits the lane change, the control manager 180 instructs the lane change controller 150 to perform lane change, thereby causing the lane change controller 150 to execute the lane change of the host vehicle M. The process of the control manager 180 will be described in detail later.

The travel driving force output device 200 outputs a travel driving force (torque) for traveling of the vehicle to driving wheels. The travel driving force output device 200 includes, for example, a combination of an internal combustion engine, an electric motor, a transmission, and the like, and an ECU that controls these. The ECU controls the above configuration according to information input from the driving assistance device 100 or information input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor according to the information input from the driving assistance device 100 or the information input from the driving operator 80 so that a brake torque according to a braking operation is output to each wheel.

The steering device 220 includes, for example, a steering ECU and an electric motor. The electric motor, for example, changes orientations of steerable wheels by causing a force to act on a rack and pinion mechanism. The steering ECU drives the electric motor according to the information input from the driving assistance device 100 or the information input from the driving operator 80 to change the orientations of the steerable wheels.

[Lane Change Recommendation]

Figure 2:
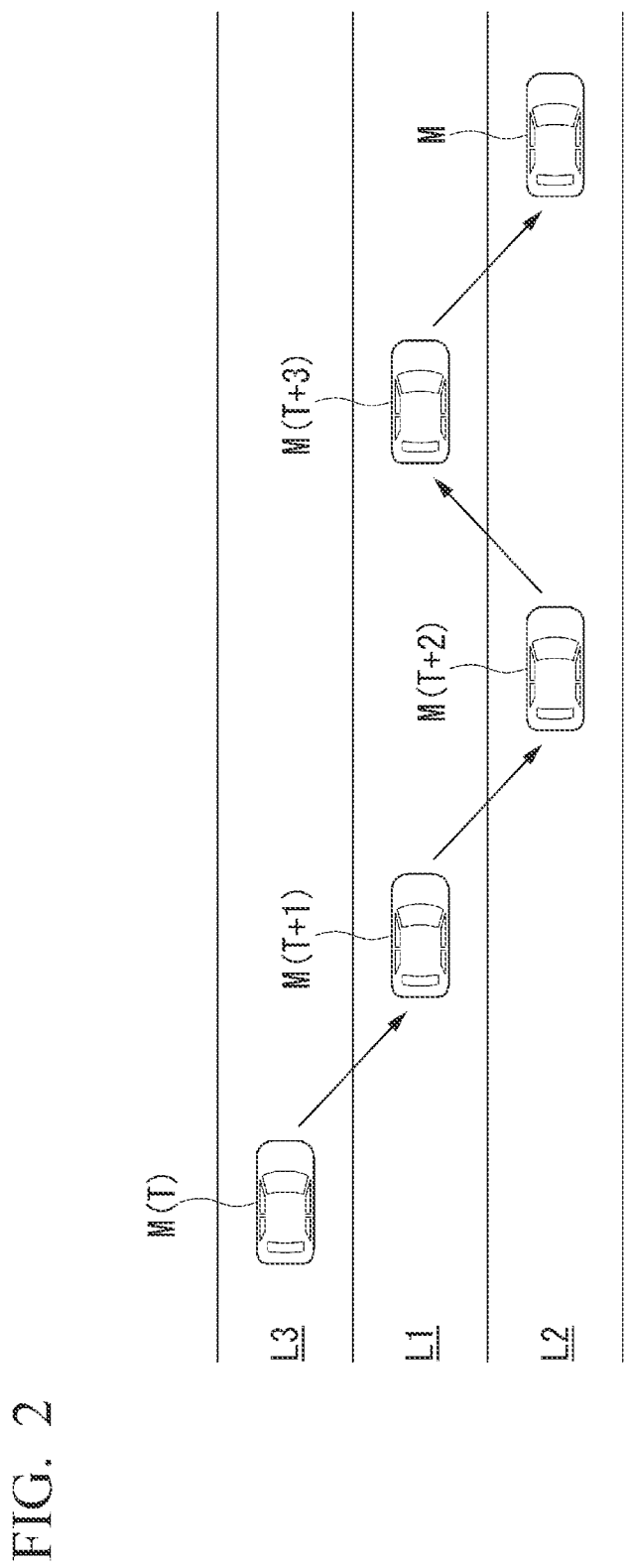
FIG. 2 is a diagram showing an example of a scene in which a recommender recommends lane change.

The recommender 160 recommends lane change to the driver. FIG. 2 is a diagram showing an example of a scene in which the recommender 160 recommends lane change. In FIG. 2, a first lane L1 and a third lane L3 are traveling lanes, and a second lane L2 is an overtaking lane. The first lane L1 is a lane provided between the second lane L2 and the third lane L3.

When the host vehicle M is traveling in the third lane L3 on the basis of control according to the ACC and the hands-off lane keeping control (at time T), the recommender 160 makes a recommendation to cause the host vehicle M to perform lane change to the first lane L1, for example. The recommendation is made by vocal sound, an image, or the like via the HMI 40, for example. When the driver operates an approval button (not shown) in response to the recommendation and grips the steering wheel, the lane change controller 150 causes the host vehicle M to perform lane change. The approval for the recommendation may be performed by one of the operation of the approval button and the gripping of the steering wheel, or by both of the operation of the approval button and the gripping of the steering wheel.

When the host vehicle M is traveling in the first lane L1 (at time T+1), the recommender 160, for example, makes recommendation to cause the host vehicle M to perform lane change to the third lane L3, which is an overtaking lane. When the host vehicle M changes lanes and travels in the second lane L2 (at time T+2), the recommender 160, for example, makes recommendation to cause the host vehicle M to perform lane change to the first lane L1, which is the traveling lane, and makes recommendation to cause the host vehicle M to perform lane change to the third lane L3, which is an overtaking lane, when the host vehicle M performs lane change to the first lane L1 (at time T+3).

Thus, the recommender 160 makes recommendation to cause the host vehicle M to perform lane change to the overtaking lane when the host vehicle M is located in the traveling lane, and to cause the host vehicle M to perform lane change to an adjacent traveling lane when the host vehicle M is located in the overtaking lane. Hereinafter, this processing may be referred to as "road recommendation".

When the host vehicle M is scheduled to travel on a branch road connecting to the third lane L3, the recommender 160 stops the road recommendation and makes recommendation to cause the host vehicle M to perform lane change to the third lane L3. The recommender 160 stops the road recommendation when the position of the host vehicle M satisfies conditions as will be described later.

[Description of Scene in which Lane Disappears (Decreases)]

Figure 3:
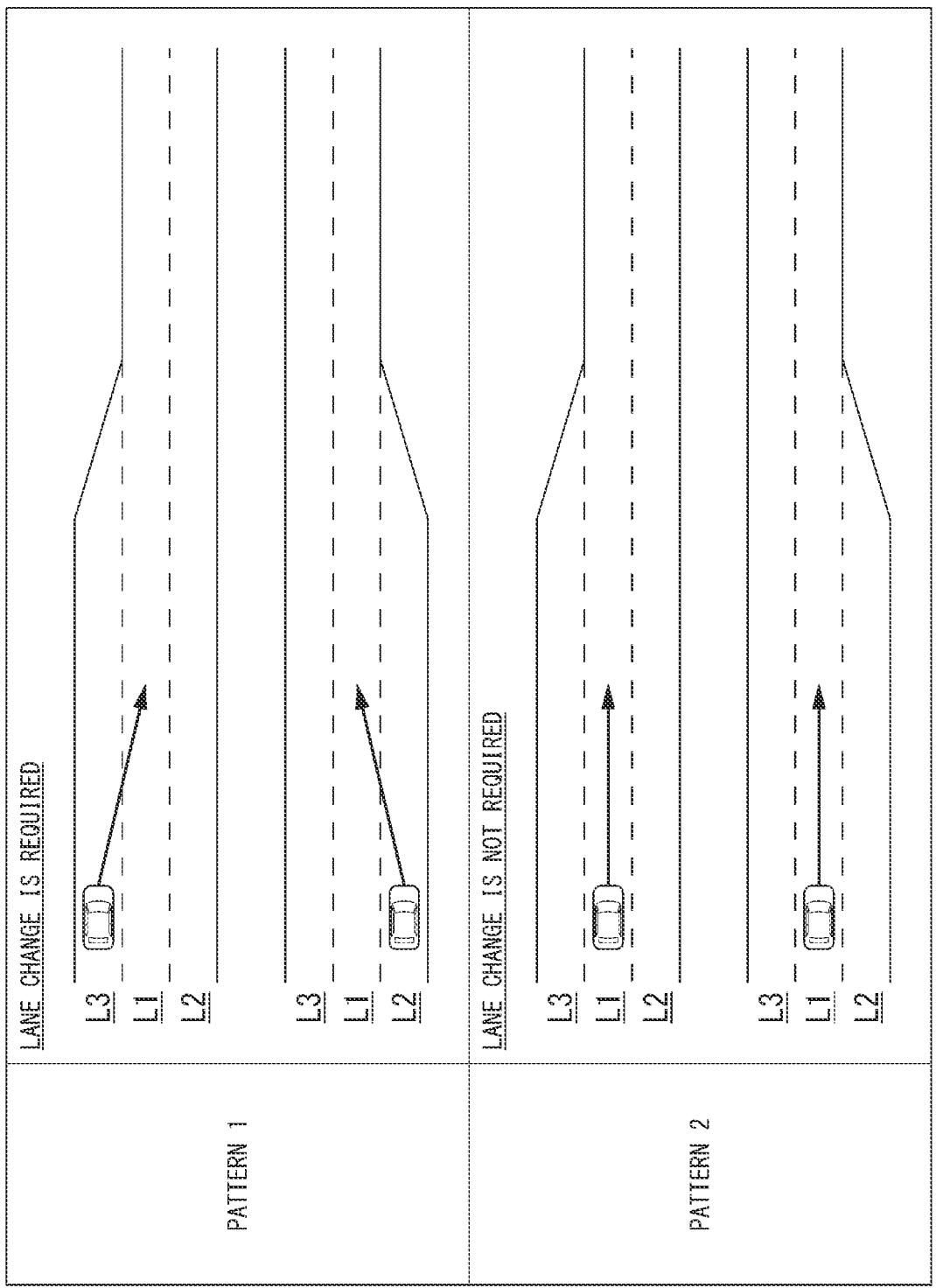
FIG. 3 is a diagram for describing pattern 1 and pattern 2.

When any one of a plurality of lanes disappears (decreases) on the way, there are pattern 1 in which lane change is necessary and pattern 2 in which it is not necessary to perform lane change depending on the lane in which the host vehicle M travels. FIG. 3 is a diagram for describing pattern 1 and pattern 2. Pattern 1 is a pattern in which the host vehicle M is traveling in a disappearing lane. Pattern 1 is, for example, a pattern in which the host vehicle M travels in the disappearing third lane L3 or the host vehicle M travels in the disappearing second lane L2. Pattern 2 is a pattern in which the host vehicle M does not travel in a disappearing lane. Pattern 2 is, for example, a pattern in which the host vehicle M is traveling in the first lane L1.

[Control in Pattern 1]

Figure 4:
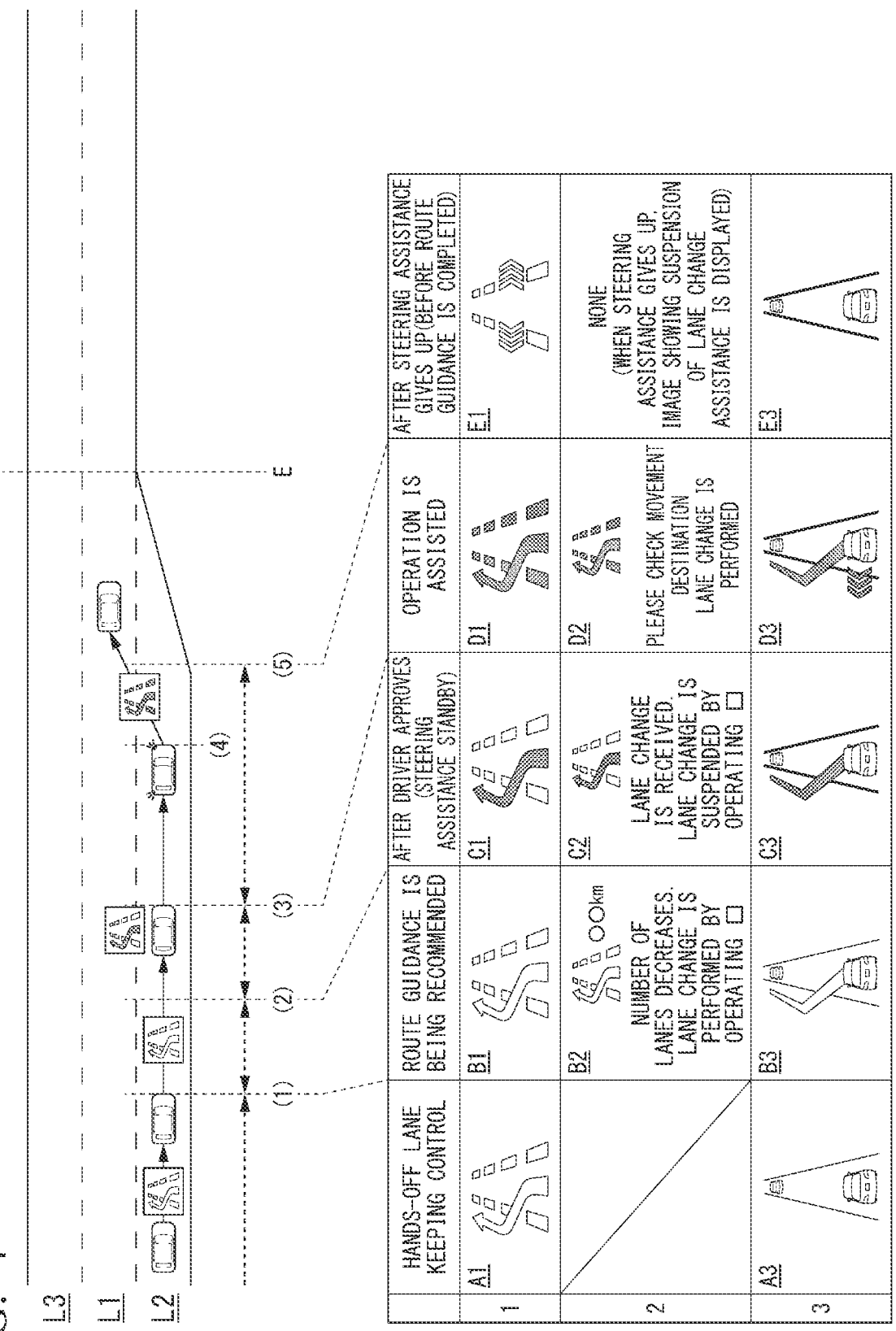
FIG. 4 is a diagram for describing control in pattern 1.

When the host vehicle M is traveling in a disappearing lane, the driving assistance device 100 performs route guidance so that the host vehicle M performs lane change to an adjacent lane. FIG. 4 is a diagram for describing the control in pattern 1. In the example of FIG. 4, it is assumed that the host vehicle M is traveling in the second lane L2 that disappears a predetermined distance ahead. In the example of FIG. 4, a position (1), a position (2), a position (3), a position (4), and a position (5) are farther away in this order in a traveling direction from a disappearance position E of the third lane L3. At the position (1), the road recommendation stops. In the following description, speed control of the host vehicle M will be omitted, but the speed is appropriately controlled in consideration of a surroundings situation so that the lane change is performed smoothly.

The hands-off lane keeping control is executed until the host vehicle M reaches the position (1). In this case, the control manager 180 displays an image A1 in a first area of the display, does not display an image in a second area, and displays an image A3 in a third area.

The first area, the second area, and the third area may be different displays (display devices) or may be different areas in one display. For example, the first area, the second area, and the third area may be different areas in a multi-information display provided in front of a seat of the driver. The image displayed in the first area is, for example, an image corresponding to an indicator that notifies the driver of a state of the host vehicle M.

The image A1 is, for example, an image that makes recommendation to perform lane change to the first lane L1. The image A3 is, for example, an image including the surroundings situation of the host vehicle M. The surroundings situation of the host vehicle M is, for example, an image showing information of other vehicles detected by the vehicle system 1, road demarcation lines, or the like.

The route guidance is recommended in a section from the position (1) that the host vehicle M reaches to the position (2) that the host vehicle M reaches. The recommendation of the route guidance is recommendation of causing the host vehicle M to perform lane change when lane change is necessary. The control manager 180 causes an image B1 to be displayed in the first area of the display, causes an image B2 to be displayed in the second area of the display, and cases an image B3 to be displayed in the third area of the display. The recommendation of the route guidance is performed for a first time (for example, a maximum of 10 seconds).

The image B1 is the same as the image A1. The image B2 includes information indicating that the lane will decrease a predetermined distance ahead, information indicating that the lane change can be performed when the approval button is operated, and the image B1. The image B3 includes an image showing a future trajectory of the host vehicle M when lane change is performed, in addition to the information of the image A3.

It is assumed that the driver has approved the lane change in the section from the position (2) that the host vehicle M reaches to the position (3) that the host vehicle M reaches. In this case, a steering assistance standby state is entered, and the control manager 180 causes an image C1 to be displayed in the first area of the display, causes an image C2 to be displayed in the second area, and causes an image C3 to be displayed in the third area. The images C1, C2, and C3 are displayed during a second time (for example, a maximum of 30 seconds). The second time is longer than the first time.

The image C1 is an image in which an arrow indicating a direction of the lane change of the host vehicle M included in the image A1 or the image B1 is emphasized as compared to than the arrow of the images A1 and B1. The image C2 includes information indicating that the lane change has been received, information indicating that the lane change can be suspended when the approval button is operated, and the image C1. The image C3 is the same information as the image B3, but colors of arrows, road demarcation lines, and the like of the image B3 are different. In the image C3, reception of the lane change is represented by colors used in the image B3 and change in the colors.

When the recommendation is not approved at the position (3) or at a predetermined distance before the position (3), the following steering assistance is not started, and the driver needs to perform lane change of the host vehicle M. For example, the driver drives the host vehicle M to perform lane change or operates the direction indicator to cause the lane change controller 150 to perform lane change of the host vehicle M.

When the host vehicle M reaches the position (3), steering assistance is started. The start of the steering assistance means that the host vehicle M starts a lane change operation. The start of the operation may be that the control manager 180 turns on the direction indicator or may be that the host vehicle M has started lateral movement. The start of the operation may be another preset operation. A condition for the steering assistance is hands-on.

In a section until the host vehicle M reaches the position (5) from the position (3), an image showing that steering assistance is being performed is displayed. The control manager 180 causes an image D1 to be displayed in the first area of the display, causes an image D2 to be displayed in the second area, and causes an image D3 to be displayed in the third area.

The image D1 is an image in which the image C1 is included and road demarcation lines included in the image C1 are emphasized as compared to the road demarcation lines in the image C1. The image D2 includes information for requesting the driver to confirm a movement destination, information indicating that lane change is performed, and the image D1. The image D3 includes information (an arrow assigned to the left side of the vehicle) indicating that the host vehicle M is changing lanes, in addition to the information included in image C3.

The position (4) is a steering assistance give-up position. When the host vehicle M cannot start lateral movement by the time the host vehicle M reaches the position (4), the steering assistance is suspended. "The host vehicle M cannot perform the lateral movement" means, for example, that the driver does not grip the steering wheel, that the host vehicle M cannot start lane change according to a situation of surrounding vehicles (for example, that the host vehicle M interferes with other vehicles when lane change is performed), that driving assistance device 100 has determined that recognition of the position of the host vehicle M is indefinite, that the lanes cannot be recognized, that traffic congestion is occurring ahead, and that conditions on which another lane change cannot be started are satisfied. Further, operation assistance is also stopped when a condition for interrupting the vehicle change after the lateral movement has been started are satisfied. The interrupting condition is, for example, a condition that is the same as or similar to conditions in which the host vehicle M cannot start the lateral movement.

After the steering assistance gives up, the control manager 180 causes an image E1 to be displayed in a first area of the display, does not cause an image to be displayed in a second area, and causes an image E3 to be displayed in a third area. These images are displayed in a case in which the steering assistance gives up before route guidance (lane change) is completed.

The image E1 is an image showing that road recommendation (recommendation of lane change by the vehicle system 1) has not been made and the lane change can be performed by an operation of the driver. In a case in which the image E1 is displayed, the lane change can be performed by the lane change controller 150 when the driver operates the direction indicator. The image E3 is, for example, an image showing the surroundings situation of the host vehicle M. When the steering assistance is to give up, the control manager 180 causes an image showing that the steering assistance for the lane change is suspended, to be displayed in the second area.

As described above, when the host vehicle M is traveling in a decreasing lane, route guidance is recommended, and when the recommendation is approved, control according to the position or state of the host vehicle M is performed or an image is provided to the driver. This makes it possible for the driver to recognize the state of the host vehicle M and cause the host vehicle M to perform lane change without depending on an operation.

[Processing after Lane Change]

Figure 5:
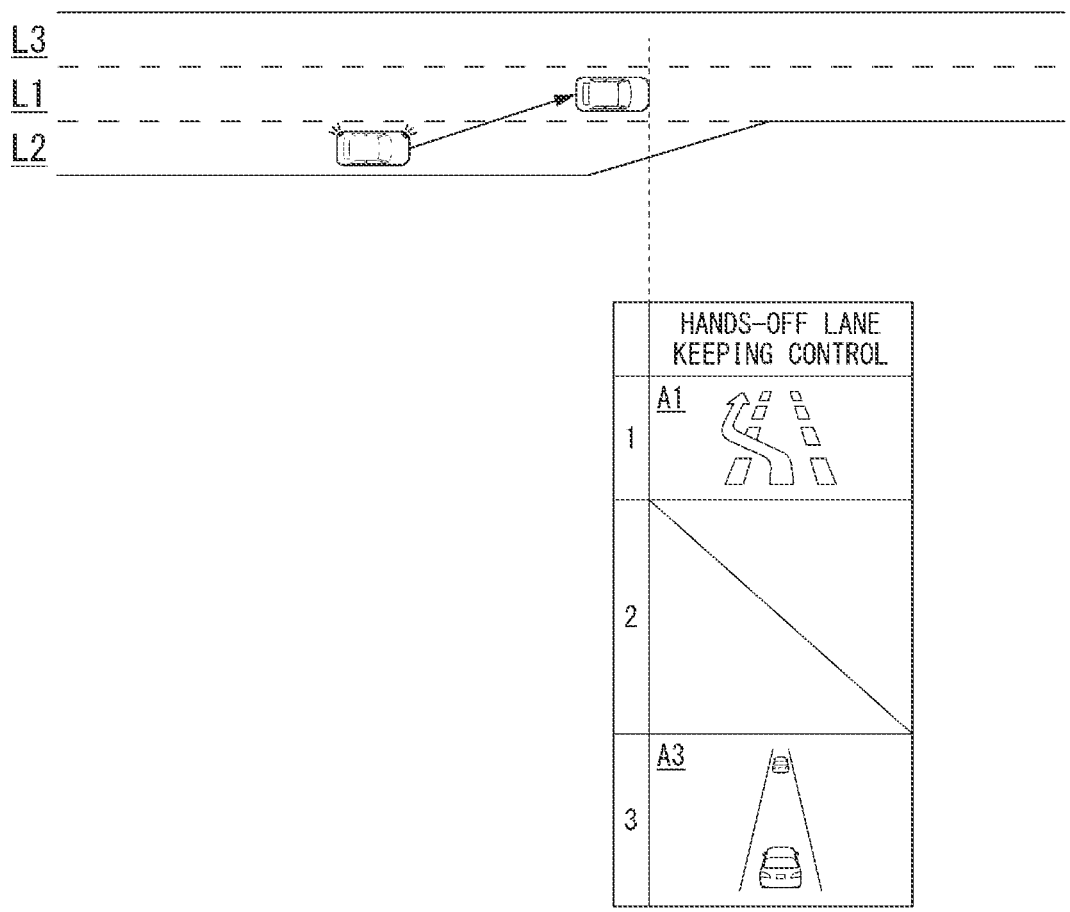
FIG. 5 is a diagram showing an example of a scene in which a host vehicle changes lanes through steering assistance.

FIG. 5 is a diagram showing an example of a scene in which the host vehicle M changes lanes according to steering assistance. The control manager 180 resumes the road recommendation when the host vehicle M performs lane change to the first lane L1. In this case, the control manager 180 causes the image A1 to be displayed in the first area and causes the image A3 to be displayed in the second area. A position at which the road recommendation is resumed is, for example, a position at which the lane change of the host vehicle M is completed. The completion means, for example, that the host vehicle M has reached a center or near the center of the first lane L1, or that the host vehicle M is brought to a state in which the host vehicle M can stably travel in the first lane L1 (for example, surroundings of a road demarcation line or the like are sufficiently recognized, and the host vehicle M is controlled on the basis of a recognition result), in addition thereto.

[Control in Pattern 2]

Figure 6:
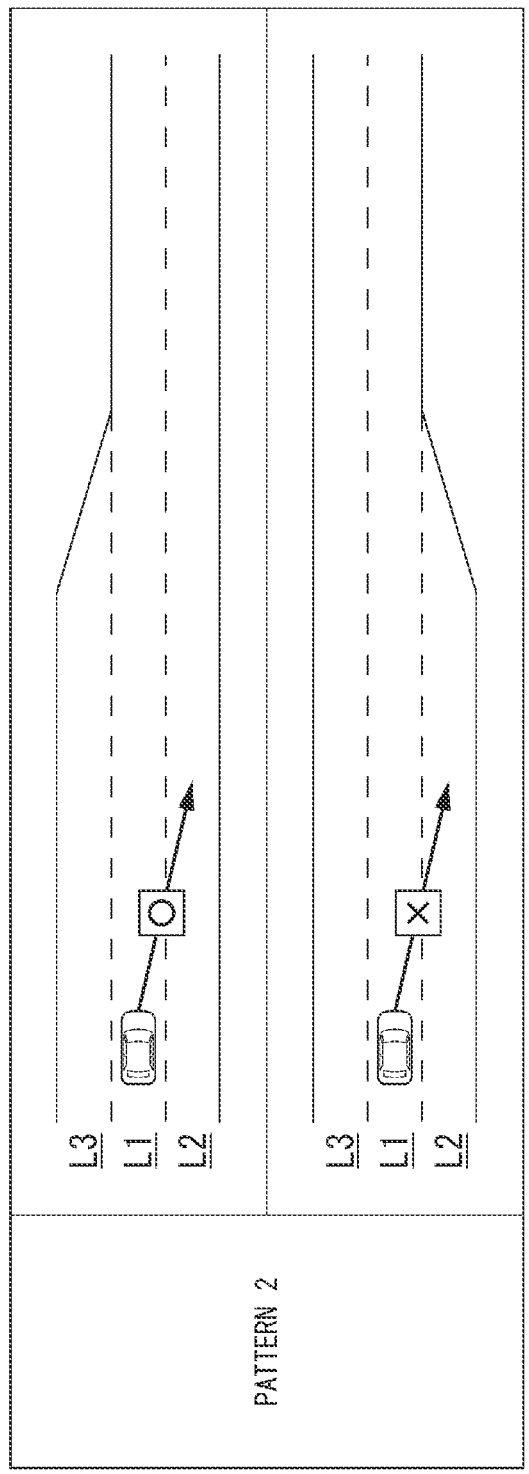
FIG. 6 is a diagram for describing whether or not road recommendation is possible.

The control manager 180 stops the road recommendation on the basis of the position of the host vehicle M and a position of the decreasing lane. FIG. 6 is a diagram for describing whether or not the road recommendation can be performed. For example, when the host vehicle M travels in the first lane L1, and the second lane L2, which is the traveling lane, decreases ahead, the road recommendation is possible. This is because the lane change to the second lane L2, which is an overtaking lane that does not disappear, is recommended by the road recommendation.

For example, in a case in which the host vehicle M travels in the first lane L1 and the second lane L2, which is an overtaking lane, decreases ahead, when the road recommendation is made as described above, recommendation of the lane change to the disappearing lane is performed and a problem occurs. Therefore, control of stopping and resuming of the road recommendation is performed as follows.

When the control manager 180 determines that the host vehicle M travels in the first lane L1 and that the second lane L2 adjacent to the first lane L1 disappears at a first distance D1 ahead from the position of the host vehicle M, the control manager 180 restricts causing the host vehicle to perform lane change to the third lane L3 adjacent to the second lane L2 and the first lane L1 and opposite to the second lane L2 without depending on an operation of the driver, and permits causing the host vehicle M to perform lane change to the third lane L3 without depending on an operation of the driver when the host vehicle M reaches a second distance D2 set between the first distance D1 and a position at which the second lane L2 disappears.

The control manager 180 does not recommend causing the host vehicle M to perform lane change to the second lane L2 and the third lane L3 when the control manager 180 determines that the host vehicle M travels in the first lane L1 and the second lane L2 disappears at the first distance D1 ahead, and recommends causing the host vehicle M to perform lane change to the third lane L3 when the host vehicle M reaches the second distance D2 set between the first distance D1 and the position at which the second lane L2 disappears.

Figure 7:
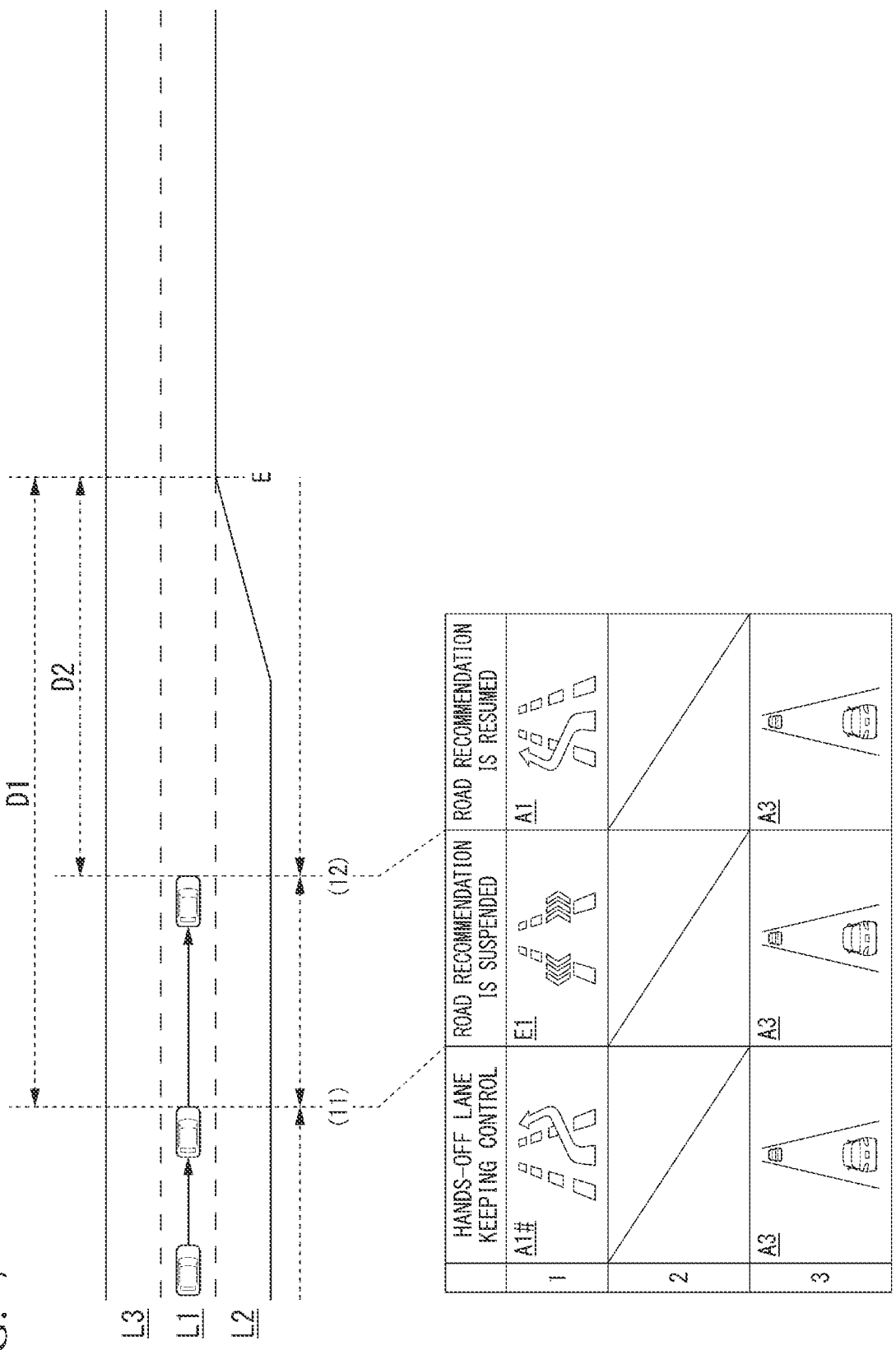
FIG. 7 is a diagram for describing stopping and resuming of the road recommendation.

FIG. 7 is a diagram for describing the stopping and resuming of the road recommendation. Differences from FIG. 4 will be mainly described. A position (11) is a position at a first distance D1 on the side opposite to a traveling direction from the disappearance position E, and a position (12) is a position at a second distance D2 from the disappearance position E on the side opposite to the traveling direction. The second distance D2 is a distance shorter than the first distance D1. The position (12) is between the position (11) and the disappearance position E.

The hands-off lane keeping control is executed and the road recommendation is made until the host vehicle M reaches the position (11). In this case, the control manager 180 causes an image A1 # to be displayed in the first area of the display, does not cause an image to be displayed in the second area, and causes an image A3 to be displayed in the third area. The image A1 # is an image in which an arrow regarding lane change to a left direction in the image A1 is replaced with an arrow regarding lane change to a right direction.

The control manager 180 stops the road recommendation in a section from a time when the host vehicle M reaches the position (11) to a time when the host vehicle M reaches the position (12). The lane change recommendation by the driving assistance device 100 is stopped (the first control is restricted). When the road recommendation is stopped, the driver can operate the direction indicator to cause the host vehicle M to perform lane change to a desired lane or the driver can perform an operation to cause the host vehicle M to perform lane change (the second control is permitted). The control manager 180 causes an image E1 to be displayed in a first area, does not cause an image to be displayed in a second area, and causes the image A3 to be displayed in a third area.

When the host vehicle M reaches the position (12), the control manager 180 resumes the road recommendation. The control manager 180 displays the image A1 in a first area, does not display an image in a second area, and displays the image A3 in a third area. When the driver performs an operation for approving the recommendation, the host vehicle M performs lane change to the third lane L3.

The first distance D1 described above is any distance (for example, a distance of 3000 m or about 3000 m). The second distance D2 is any distance shorter than the first distance D1 (for example, a distance of 1000 m or about 1000 m).

For example, a position corresponding to the second distance D2 is the above-described position at which the operation assistance gives up or a position set on the basis of the above-described position at which the steering assistance gives up (for example, a position after the position at which the steering assistance gives up, which is a position before the disappearance position E). The position at which the steering assistance gives up is an example of "a position at which the controller stops control for performing lane change by controlling the steering due to continuation of a state in which the host vehicle cannot be caused to perform lane change, when it is assumed that the host vehicle travels in the second lane and the controller automatically controls the steering without depending on an operation of the driver to perform lane change to the first lane."

Figure 8:
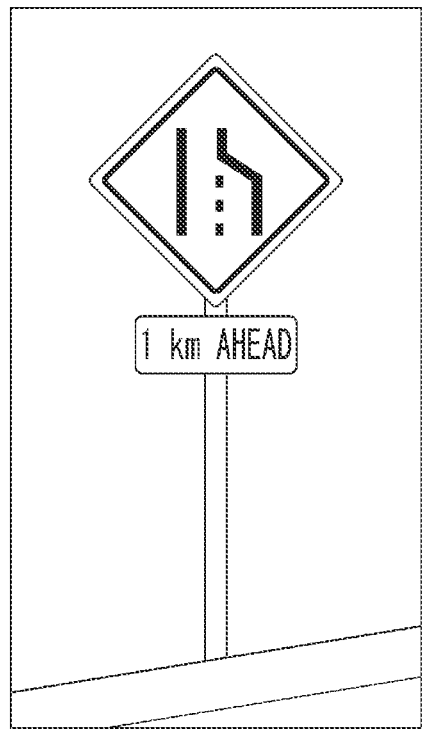
FIG. 8 is a diagram showing an example of a sign.

For example, the position corresponding to the second distance D2 may be a position at which the driver can recognize that the second lane L2 decreases ahead or a position based on the position at which the driver can recognize (a position after the position at which the driver becomes able to recognize, which is a position before the disappearance position E). For example, the position corresponding to the second distance D2 is set on the basis of a position at which a marking, signboard, sign (see FIG. 8), or the like indicating that the second lane L2 of the road decreases is provided. For example, a position at which the driver can recognize a sign or the like and a position at which the steering assistance gives up are the same positions or positions close to each other. The second distance D2 is not limited to the above and may be set to a position between the first distance D1 and the disappearance position E.

For example, when the map information includes a position at which a marking, signboard, sign, or the like is provided, the control manager 180 specifies the position corresponding to the second distance D2 on the basis of the position of the host vehicle M and the map information. The control manager 180 may specify the position corresponding to the second distance D2 on the basis of the recognition result of the recognizer 110. For example, the control manager 180 may determine a position at which a marking, signboard, sign, or the like recognized by the recognizer 110 has been provided or a predetermined distance before this position, to be the position corresponding to the second distance D2.

For example, when the control of the present embodiment is not taken into account, lane change to the second lane L2 is recommended by the road recommendation until the host vehicle M reaches the position (12). On the other hand, in the present embodiment, the road recommendation is stopped until the host vehicle M reaches the position (12), and the lane change to the third lane L3 is recommended by the road recommendation when the host vehicle M reaches the position (12). In this case, although the recommendation is recommendation of a lane different from a usual case (normally, the lane change to the second lane L2 is recommended), the driver can understand the meaning of the recommendation of the lane change to the third lane L3 when the driver can recognize the above-described sign or the like, and discomfort is not given to the driver.

Further, since the road recommendation is stopped in a section from the position (11) to the position (12), recommendation of a decreasing lane is not performed by the recommendation of the vehicle system 1. For example, when the recommendation of the third lane L3 is performed without stopping of the road recommendation, the driver may feel discomfort because such recommendation is recommendation of a lane different from previous recommendation. In the present embodiment, since the lane change to the third lane L3 is not recommended in the section from the position (11) to the position (12), discomfort is not given to the driver, and recommendation of a decreasing lane is not performed.

As described above, the driving assistance device 100 can further improve convenience for the driver. Specifically, since the driving assistance device 100 early resumes the road recommendation without giving discomfort to the driver, it is possible to improve convenience for the driver.

In the above example, "restrict" and "permit" mean, for example, "restrict" and "permit" the lane change according to the proposal of the driving assistance device 100 (the vehicle system 1). That is, the driving of the driver or the driver operating the direction indicator or a button for lane change (not shown) to cause the host vehicle M to perform the lane change is not a target of the "restrict" and "permit".

Instead of the above, one or both of causing the host vehicle M to perform the lane change according to driving (steering operation) of the driver and causing the host vehicle M to perform lane change by the driver operating the direction indicator or the button for lane change (not shown) may become a target of the "restrict" and "permit", in addition to the lane change according to the proposal.

[Flowchart]

Figure 9:
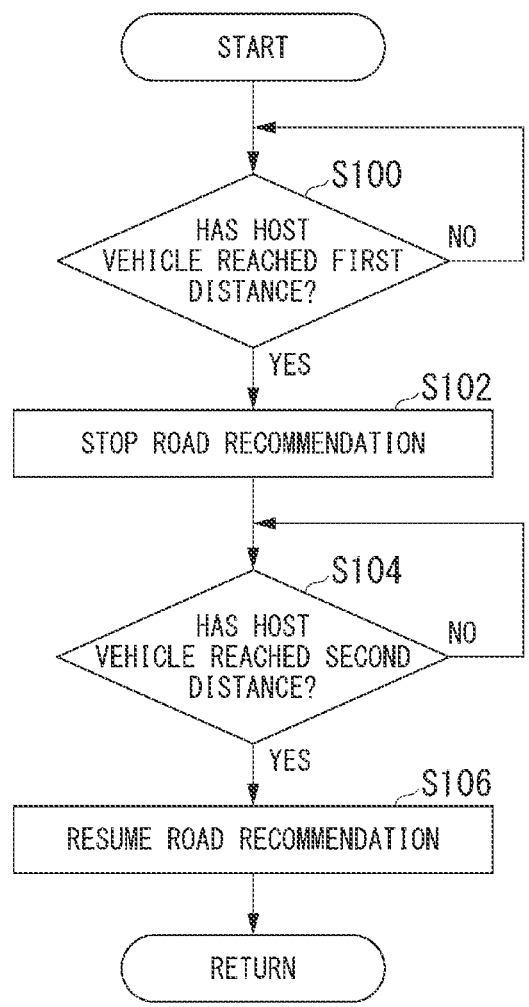
FIG. 9 is a flowchart showing an example of a flow of processing that is executed by a driving assistance device.

FIG. 9 is a flowchart showing an example of a flow of processing that is executed by the driving assistance device 100. This processing is processing that is executed when the road recommendation is being made. First, the control manager 180 of the driving assistance device 100 determines whether or not the host vehicle M has reached the first distance (step S100). When the host vehicle M reaches the first distance, the control manager 180 stops the road recommendation (step S102). The control manager 180 stops the lane change according to the proposal of the vehicle system 1.

The control manager 180 determines whether or not the host vehicle M has reached the second distance (step S104). When the host vehicle M reaches the second distance, the control manager 180 resumes the road recommendation (step S106). Accordingly, the processing of one routine in the present flowchart ends.

[Others]

Figure 10:
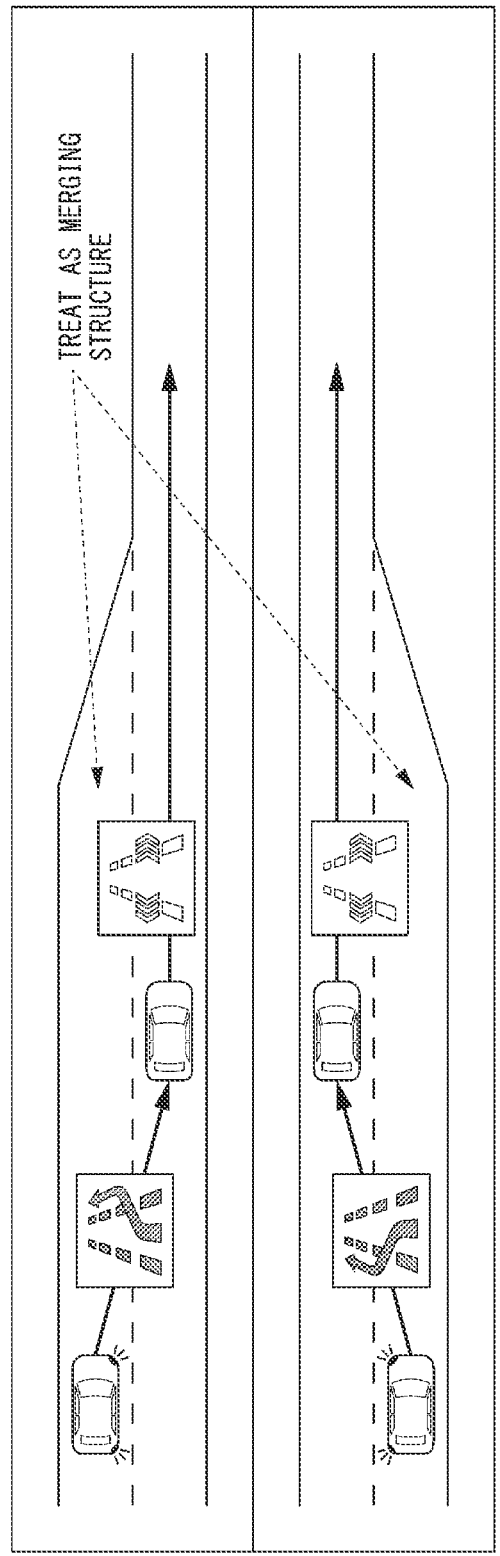
FIG. 10 is a diagram showing an example of a road of which the number of lanes decreases to a single lane.

When the number of lanes decreases to a single lane, the control manager 180 treats a decreasing lane as a merging structure and does not count the decreasing lane as a main lane. Accordingly, the control manager 180 does not recommend the lane change to the decreasing lane in the road recommendation. FIG. 10 is a diagram showing an example of a road of which the number of lanes decreases to a single lane. It is assumed that the host vehicle M1 travels in the decreasing lane and then performs lane change to an adjacent lane under the control of driving assistance device 100. When the host vehicle M is located in front of a start position at which the lane narrows in the traveling direction, the control manager 180 does not count the decreasing lane as the main lane and recognizes the main lane as a single lane. Accordingly, even when the road recommendation is resumed, lane change to the decreasing lane is not recommended.

According to the embodiment described above, since the driving assistance device 100 restricts or permits causing the host vehicle to perform lane change on the basis of the position of the host vehicle M when an adjacent lane decreases in size, it is possible to improve convenience for a user.

The embodiment described above can be expressed as follows.

A control device includes
a storage device having a program stored therein, and
a hardware processor, and
wherein the hardware processor executes the program stored in the storage device to execute:
processing for recognizing a situation of surroundings of a host vehicle,
processing for specifying a position of the host vehicle in map information including information on lanes on the basis of the map information and a position of the host vehicle,
processing for restricting causing the host vehicle to perform lane change to a third lane adjacent to a second lane and a first lane and opposite to the second lane without depending on an operation of a driver when determining that the host vehicle travels in the first lane and the second lane adjacent to the first lane disappears at a first distance ahead from the position of the host vehicle on the basis of a result of the specifying of the specifier, and
processing for permitting causing the host vehicle to perform lane change to the third lane without depending on an operation of the driver when the host vehicle reaches a second distance set between the first distance and a position at which the second lane disappears.

While forms for carrying out the present invention have been described using the embodiments, the present invention is not limited to these embodiments at all, and various modifications and substitutions can be made without departing from the gist of the present invention.

What is claimed is:

1. A vehicle system comprising:
a storage medium configured to store computer-readable instructions; and
one or more processors connected to the storage medium, wherein the one or more processors execute the computer-readable instructions to:
recognize a situation of surroundings of a host vehicle,
automatically control at least steering of the host vehicle on the basis of the recognized situation of the surroundings,
specify a position of the host vehicle in map information including information on lanes on the basis of the map information and a position of the host vehicle,
restrict causing the host vehicle to perform lane change from a first lane to a third lane on a road without depending on an operation of a driver when it is determined that the host vehicle is traveling in the first lane on the road and that only a second lane on the road disappears at a first distance ahead from the position of the host vehicle on the basis of a result of the specifying, the road including at least the first lane, the second lane and the third lane, the first lane being adjacent to and between the second lane and the third lane on the road, and
permit causing the host vehicle to perform lane change to the third lane without depending on an operation of the driver when the host vehicle reaches a second distance set between the first distance and a position at which only the second lane disappears.

2. A vehicle system comprising:
a storage medium configured to store computer-readable instructions; and
one or more processors connected to the storage medium, wherein the one or more processors execute the computer-readable instructions to:
recognize a situation of surroundings of a host vehicle,
automatically control at least steering of the host vehicle on the basis of the recognized situation of the surroundings,
specify a position of the host vehicle in map information including information on lanes on the basis of the map information and a position of the host vehicle,
restrict causing the host vehicle to perform lane change executed according to a proposal of the vehicle system, the lane change being lane change from a first lane to a third lane on a road, when it is determined that the host vehicle is traveling in the first lane on the road and that only a second lane on the road disappears at a first distance ahead from the position of the host vehicle on the basis of a result of the specifying, the road including at least the first lane, the second lane and the third lane, the first lane being adjacent to and between the second lane and the third lane of the road, and
permit causing the host vehicle to perform the lane change from the first lane to the third lane according to the proposal of the vehicle system when it is determined that only the second lane disappears at a second distance shorter than the first distance ahead from the position of the host vehicle.

3. The vehicle system according to claim 2,
wherein the one or more processors execute the computer-readable instructions to:
be able to execute first control for causing the host vehicle to perform lane change to an adjacent lane without depending on an operation of a driver of the host vehicle when the proposal of the vehicle system is approved, and
second control for causing the host vehicle to perform the lane change to the adjacent lane without depending on the operation of the driver when the driver performs a predetermined operation for causing the lane change to be executed, and
restrict the first control and permit the second control when determining that the host vehicle travels in the first lane and that only the second lane disappears at a first distance ahead from the position of the host vehicle on the basis of a result of the specifying.

4. The vehicle system according to claim 3, wherein the predetermined operation is that the driver operates a lever for operating a direction indicator in a direction in which the host vehicle is desired to perform lane change.

5. The vehicle system according to claim 2,
wherein the one or more processors execute the computer-readable instructions:
not to recommend causing a driver to perform lane change of the host vehicle to the second lane and the third lane when the host vehicle is located between the first distance and the second distance, and
to recommend causing the driver to perform lane change of the host vehicle to the third lane when the host vehicle passes through a position at the second distance.

6. The vehicle system according to claim 5,
wherein the one or more processors execute the computer-readable instructions to:
cause the host vehicle to perform the lane change to the third lane without depending on an operation of the driver when the recommendation is approved by the driver.

7. The vehicle system according to claim 2,
wherein the one or more processors execute the computer-readable instructions to:
recommend causing the driver to perform lane change of the host vehicle to the second lane when the host vehicle does not reach the first distance and travels in the first lane,
recommend causing the driver to perform lane change of the host vehicle to the first lane when the host vehicle does not reach the first distance and travels in the second lane, and
recommend causing the driver to perform lane change of the host vehicle to the first lane when the host vehicle does not reach the first distance and travels in the third lane, and
the one or more processors execute the computer-readable instructions to
perform the lane change of the host vehicle to an adjacent lane according to the recommendation without depending on the operation of the driver when the driver approves the recommendation.

8. The vehicle system according to claim 1, wherein a position corresponding to the second distance at which the lane change of the host vehicle to the third lane is permitted after the lane change is restricted is set on the basis of a position at which the host vehicle stops control for performing lane change by controlling the steering due to continuation of a state in which the host vehicle is unable to be caused to perform lane change, when it is assumed that the host vehicle travels in the second lane and the host vehicle automatically controls the steering without depending on an operation of the driver to perform lane change to the first lane.

9. The vehicle system according to claim 1, wherein a position corresponding to the second distance at which the lane change of the host vehicle to the third lane is permitted after the lane change is restricted is a position at which the host vehicle determines that the host vehicle has reached a predetermined distance position with respect to a marking or a road structure indicating that the second lane decreases in size.

10. The vehicle system according to claim 9,
wherein the one or more processors execute the computer-readable instructions to:
determine whether the host vehicle has reached the predetermined distance position with respect to the marking or the road structure on the basis of a result of the recognition.

11. The vehicle system according to claim 9,
wherein the one or more processors execute the computer-readable instructions to:
determine whether the host vehicle has reached the predetermined distance position with respect to the marking or the road structure on the basis of map information including information on the marking or the road structure and the position of the host vehicle.

12. A vehicle system comprising:
a storage medium configured to store computer-readable instructions; and
one or more processors connected to the storage medium, wherein the one or more processors execute the computer-readable instructions:
to recognize a situation of surroundings of a host vehicle,
to automatically control at least steering of the host vehicle on the basis of the recognized situation of the surroundings,
to specify a position of the host vehicle in map information including information on lanes on the basis of the map information and a position of the host vehicle,
not to propose causing the host vehicle to perform lane change from a first lane to a third lane on a road when it is determined that the host vehicle is traveling in the first lane on the road and that only a second lane on the road disappears at a first distance ahead from the position of the host vehicle on the basis of a result of the specifying, the road including at least the first lane, the second lane and the third lane, the first lane being adjacent to and between the second lane and the third lane on the road, and
to propose causing the host vehicle to perform the lane change from the first lane to the third lane according to the proposal of the vehicle system when it is determined that only the second lane disappears at a second distance shorter than the first distance ahead from the position of the host vehicle.

13. The vehicle system according to claim 1,
wherein the second lane is an overtaking lane.

14. The vehicle system according to claim 1,
wherein, when the host vehicle is located between a first position of the first distance and a second position of the second distance, the automatic control is different between a case in which it is determined that the second lane will disappear and a case in which it is determined that the second lane will not disappear.

* * * * *